United States Patent
Lindoff et al.

(10) Patent No.: US 7,706,329 B2
(45) Date of Patent: Apr. 27, 2010

(54) METHOD AND APPARATUS FOR COMPRESSED MODE HANDLING IN A DUAL RECEIVER USER EQUIPMENT (UE)

(75) Inventors: Bengt Lindoff, Bjärred (SE); Torgny Palenius, Barsebäck (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 748 days.

(21) Appl. No.: 11/552,399

(22) Filed: Oct. 24, 2006

(65) Prior Publication Data

US 2008/0095132 A1 Apr. 24, 2008

(51) Int. Cl.
H04W 36/30 (2009.01)
(52) U.S. Cl. ............ 370/332; 370/329; 370/339; 455/424; 455/552.1; 455/553.1
(58) Field of Classification Search .......... 370/329, 370/332, 339; 455/424, 552.1, 553.1
See application file for complete search history.

(56) References Cited

U.S. PATENT DOCUMENTS

2003/0193969 A1* 10/2003 Pecen et al. ............ 370/509
2003/0218995 A1* 11/2003 Kim et al. ............... 370/318
2004/0152429 A1* 8/2004 Haub et al. ............. 455/102
2005/0094816 A1 5/2005 Lindoff et al.

FOREIGN PATENT DOCUMENTS

WO WO 98/54849 12/1998

OTHER PUBLICATIONS

Lugara D, et al.: "UMTS to GSM handover based on compressed moved technique" Communications, 2004 IEEE International Conference, Paris, France Jun. 20-24, 2004, Piscataway, NJ pp. 3051-3055, XP101709763.
Christopher Brunner, et al.: "Inter-System Handover Parameter Optimization" Vehicular Technology Conference, 2006. VTC-2006 Fall. 2006 IEEE 64th, IEEE, PI, Sep. 1, 2006 pp. 1-6, XP-031051240.

* cited by examiner

Primary Examiner—Dwayne Bost
Assistant Examiner—Christopher Henry
(74) Attorney, Agent, or Firm—Michael G. Cameron

(57) ABSTRACT

A method relating to inter-frequency or inter Radio Access Technology (RAT) measurements (IFM) between a User Equipment (UE) and a mobile communications network (NW), and an apparatus for implementing the method, comprising operating, by a UE having a plurality of receiver branches (100) (110), detecting whether IFM is needed (120); and selecting, if IFM is needed, either to use dual antenna data reception for detecting data in compressed mode and performing IFM during gaps, or to use single antenna data reception mode (SADRM), using the second antenna for IFM based on the value of certain parameters (130).

25 Claims, 3 Drawing Sheets

METHOD AND APPARATUS FOR COMPRESSED MODE HANDLING IN A DUAL RECEIVER USER EQUIPMENT (UE)

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

A typical mobile communications network (NW) comprises a radio access subsystem having base stations and equipment for controlling the base stations, and mobile terminals, referred to as user equipment (UE). In this environment, receiver diversity has become an important feature for the UE as the UE must support high data rates, such as High Speed Downlink Packet Access (HSDPA). Receiver diversity, which is generally defined as a wireless device architecture with multiple separated receive paths, increases mobile communications network data capacity and performance.

Having multiple (e.g., at least two) antennas and corresponding receiver chains in a UE, working independently of each other makes it possible to perform inter-frequency (IF) or inter-Radio Access Technology (RAT) measurements (collectively referred to herein as IFM) for mobility management, without switching into compressed mode in the WCDMA case.

In compressed mode, the data transmission is interrupted so that the UE can change the carrier frequency and perform measurements at regular intervals. To achieve a lossless transmission, data is compressed and transmitted during a shorter time period. This may introduce reception gaps where IF measurements can be performed. In other words, to enable a UE to perform radio measurements on a frequency other than the frequency in use for the current call in connected mode using a dedicated physical channel, a compressed mode is used. In compressed mode, the data transmission is interrupted during a given time interval to allow the UE to perform measurements, and the data rate is increased outside the time interval to compensate for the transmission gap. Compressed mode results in a capacity loss of half of a frame such that a transmission gap of the remainder of the frame is introduced that could be used for IFM. For example, in WCDMA compressed mode frames, the spreading factor is halved and the base station transmit power is doubled.

BRIEF SUMMARY OF THE INVENTION

The present invention is a method and apparatus for use in a UE having receiver diversity that determines, for a particular situation, whether the receiver diversity gain is larger than the compressed mode capacity loss. If such is the case, the UE of the present invention is adapted to request compressed mode for IFM, otherwise the UE switches into single antenna data reception mode (SADRM) and at regular time intervals, uses one receiver branch for data detection and the other for IFM. The receiver diversity gain over single antenna gain is estimated based on propagation parameters. Such parameters include, but are not limited to: use of an alternative scrambling code (ASC) in compressed mode frames; the slot format or spreading factor; and the Dedicated Physical Channel (DPCH) Pilot power offset (relative Dedicated Physical Data Channel (DPDCH)). This information is received by the UE in Radio Resource Control (RRC) messages from the network (NW). Additionally, information about current services, such as Voice/Video and packet over HSDPA, could be used for the decision whether to use compressed mode for IFM. The UE could also use information such as Doppler effect (fading rate), Signal to Interference Ratio (SIR) and power delay profile (i.e. radio related) for instantaneous derivations about receiver diversity gain. Using all or a subgroup of the foregoing information, the relative benefits between using compressed mode for IFM can be determined, thereby improving the efficiency of a mobile communications network.

The present invention is a method and apparatus for handling compressed mode (CM) in a UE having receiver diversity. The steps of the method of the present invention include first determining whether to perform inter-frequency (IF) or inter-Radio Access Technology (RAT) measurements (collectively, IFM); and if it is determined to perform IFM, secondly determining whether to use compressed mode or single antenna data reception mode (SADRM). The second determining step may be performed by the UE or the network (NW). The method further comprises (1) using SADRM for IFM in the second determining step if an alternative scrambling code (ASC) is being used; or (2) using CM in the second determining step if a packet service over HSDPA is ongoing. In this method, the outcome of the second determining step can depend on propagation parameters, wherein the propagation parameters are based on information about at least one of the following: instantaneous SIR/Power Delay Profile (PDP); the active set size; geometry factor (estimated $I_{or}/I_{oc}$); and a Doppler estimate (fading rate). Alternatively, the outcome of the second determining step is based on the quality of the received signal and may be included in RRC information received by the UE. The apparatus of the present invention in a UE includes a plurality of antennas coupled to a plurality of receiver branches, the receiver branches including at least one measurement unit adapted to perform intra frequency measurements on intra frequency cells on a regular basis and perform inter frequency measurements on a regular basis; and at least one control unit (CU) adapted to receive Radio Resource Control (RRC) messages from the network (NW), the CU adapted to first determine whether to perform inter-frequency or inter Radio Access Technology (RAT) measurements (IFM), and secondly to determine whether to use compressed mode (CM) or SADRM, if it is determined to perform IFM. If a determination is made to use CM, a CM request is fed to the transmitter of the UE. The apparatus of the present invention also includes a CU adapted to schedule IFM on a regular basis. When CM is used by the UE when performing IFM, the UE is adapted to interrupt reception at CM gaps and both carrier frequencies $f_0$, and $f_1$ are changed to the carrier frequency on which IFM is to be executed and when the CM gap is complete, the carrier frequency is changed back again. When SADRM is used by the UE for IFM, the CU, on a regular basis, is adapted to change the carrier frequency $f_1$ to the carrier frequency on which the UE is to perform IFM. In the apparatus of the present invention, information can be fed from a single receiver branch to the measurement unit, while the carrier frequency for the other receiver branch remains unchanged while data reception is made using SADRM. In the apparatus of the present invention, the CU is able, when the IFM measurement period is finalized, to change $f_1$ back to the original carrier frequency and the UE is placed into dual antenna data reception mode for detecting data. Such an apparatus as described can be used in a WCDMA mobile terminal in combination with a mobile communications network.

DETAILED DESCRIPTION OF THE INVENTION

In a typical mobile communications network, a UE is connected to the network (NW) and receives Radio Resource Control (RRC) information on a regular basis, such as at connection setup, upon a handover (HO) request or at radio bearer configuration. From these RRC messages, the UE stores the information required to estimate compressed mode and receiver diversity gain compared to Single Antenna Data Reception Mode (SADRM). An example of such RRC information received at the UE is whether an alternative scrambling code (ASC) is used in compressed mode. ASC is used in order avoid code rearrangement when a UE needs to go from channelization code (i, SF) to (i, SF/2) due to CM, where SF refers to the spreading factor. Instead of moving all other users having codes below (i, SF/2) to other codes, the UE that is going to use CM is moved to another scrambling code. While this action removes much of the orthogonality in the downlink, in the case of rich multi-path, only a marginal capacity loss results.

If an ASC is used in compressed mode, not only is the spreading factor halved in compressed mode frames, but also the DPCH is encoded on a scrambling code other than the primary scrambling code under which the Common Pilot Channel (CPICH) is sorted. As a result, the interference profile is significantly changed in compressed mode frames. In such case, the receiver diversity gain in compressed mode frames, compared to SADRM where the reception is made with DPCH sorted under the Primary Synchronization Code (PSC), is likely small and SADRM is preferred.

Another situation often encountered by a UE in a NW is a DPCH pilot power offset, or slot format (i.e., the number of DPCH pilots) (relative DPCDCH). With a higher pilot offset or more DPCH pilots, a better DPCH SIR estimate can be made resulting in better power control and larger receiver diversity gain on the DPCH. In such case the receiver diversity gain is larger than the compressed mode capacity loss and compressed mode should be requested.

A UE in a NW will also receive information about ongoing service, such as whether packet service over HSDPA is ongoing. If so, compressed mode is preferred due to the potential high diversity gain on High Speed Physical Downlink Shared Channel (HS-PDSCH) and the relative low compressed mode loss on the A-DPCH (or even lower, on F-DPCH).

Figure 1:
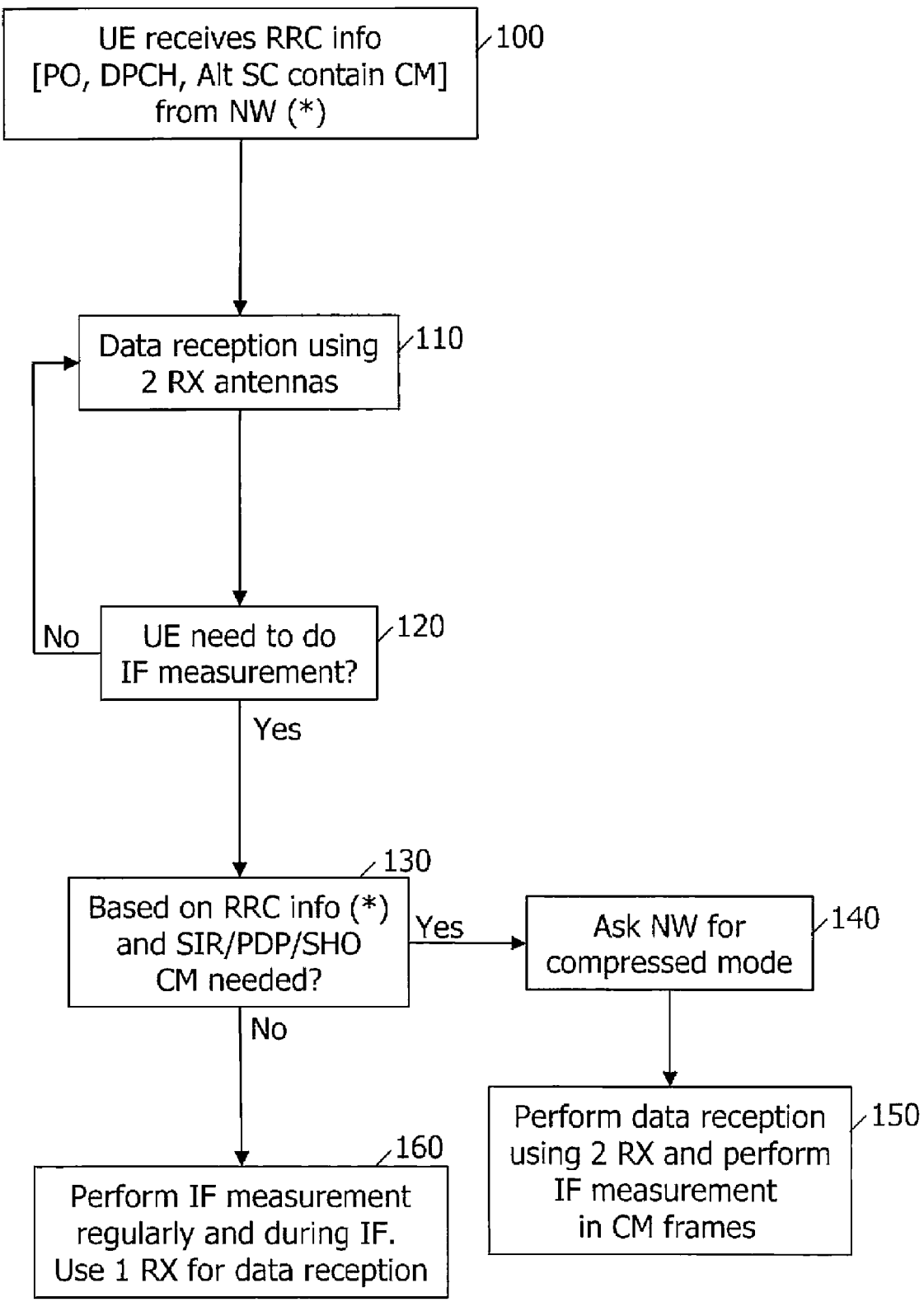
FIG. 1 is a flow chart of the steps of an embodiment of the present invention.

Referring now to the Figures, as seen in FIG. 1, in step 100, the UE receives RRC data from the NW, such as DPCH power offset and whether an ASC is being used. This data is received in step 110 using a plurality of antennas, here shown to be two (2) antennas. The UE, during this time, is receiving and decoding data using both receiver chains. In step 120, the UE detects whether an IFM is to be performed. It does this by determining the quality of a received signal, such as by detecting whether the Received Signal CPICH Code Power (RSCP) for the strongest intra-frequency cell is below a certain threshold or whether a Received Signal Strength Indicator (RSSI) is below a certain threshold, or determining if an IFM is being requested by the NW. If it is determined that an IFM is to be performed, the UE, based on RRC information received at step 100 and possible information about (1) the instantaneous SIR/Power Delay Profile (PDP), (2) the active set size, (3) Geometry factor (estimated $I_{or}/I_{oc}$) and/or (4) Doppler estimate (fading rate), decides at step 130 whether compressed mode or SADRM is to be used when performing IFM. As seen in step 130, the determination is made, in an embodiment of the present invention, as follows: If the quality of the received signal is below a predetermined threshold, then it is determined if there is a need to search for a new cell. If so, then the RRC message that was received previously is reviewed, for example upon UE switch on or after an earlier HO. Based on the review, it is determined if an ASC is being used. If an ASC is not being used, then CM is used. If ASC is being used, then calculations are performed based on the PDP. If there are a high number of multi-paths, then there is no loss with ASC, and CM should be used. If there are only a small number of multi-paths, then there is a loss with ASC and SADRM should be used. If IFM is needed, then in step 140, the UE requests CM. Then, in step 150, the UE uses the dual receiver for data reception and interrupts the reception in CM gaps to perform IFM. If CM is not needed, then in step 160, the UE, on a regular basis, switches into SADRM and performs IFM at one receiver branch and data detection at the other receiver branch.

Figure 2:
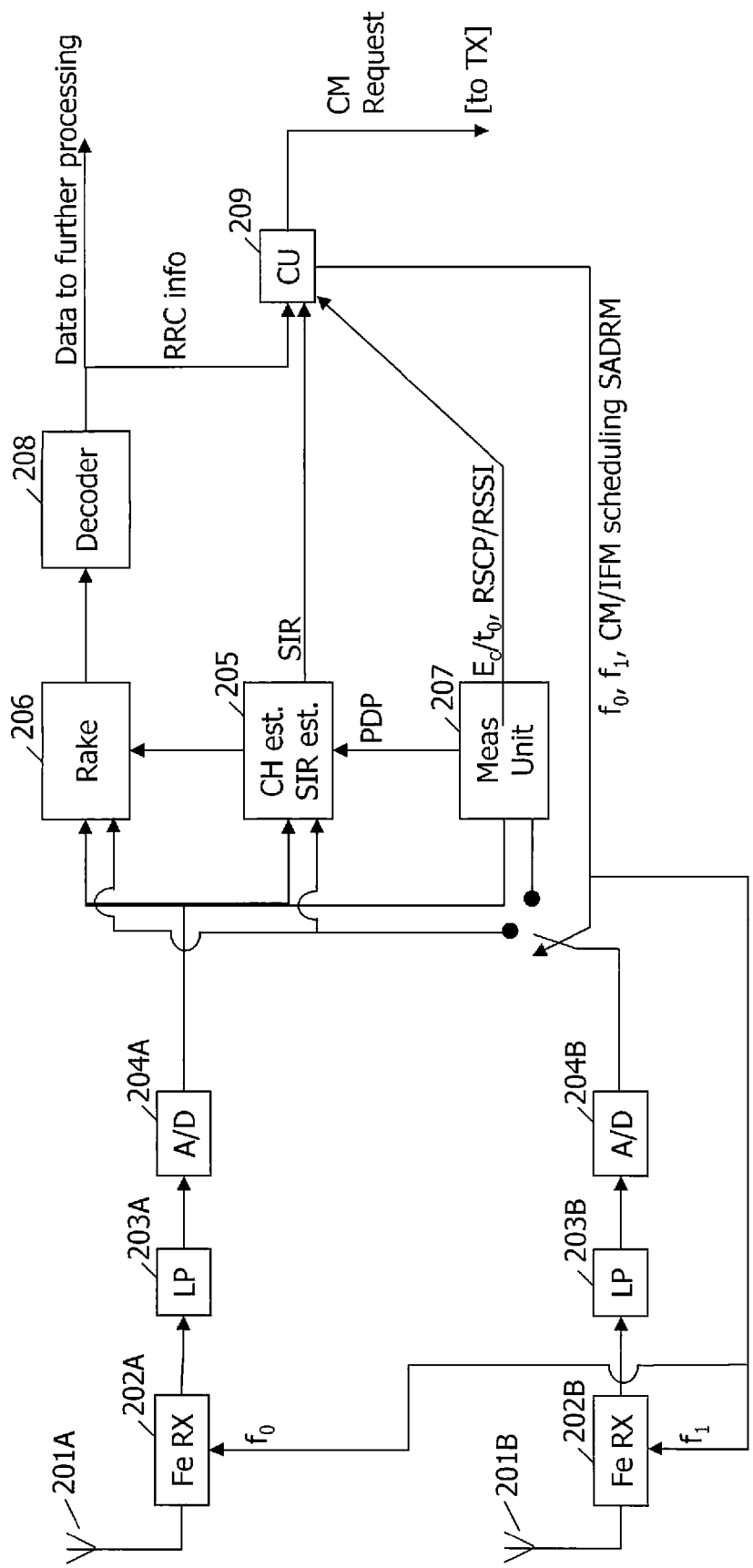
FIG. 2 is a block diagram of an embodiment of the present invention.

FIG. 2 shows a block scheme of an apparatus used to implement a method of the present invention. In this embodiment, the UE is in connected mode and the data signal is received through both antennas 201A and 201B and down converted to a baseband signal in at least two receiver chains. Such receiver chains are well known in the art and may include front end receivers, filters, and analog-to-digital converters (ADC) to convert the signal into a digital baseband signal. The signals are then fed to channel and SIR estimation units adapted to estimate the channel H and noise covariance R, and may include a RAKE receiver unit that uses the channel and covariance estimate to detect the signal, as conventionally known in the art. The output signal from the ADC is fed to a measurement unit adapted to perform intra frequency measurements (IFM) on intra frequency cells on a regular basis and perform inter frequency measurements on a regular basis. For example, a conventional path searcher detects the multi-path and estimates the Received Signal Code Power (RSCP) and RSSI and $E_c/I_o$=RSCP/RSSI. The output from the RAKE receiver unit is then fed to the decoder that de-interleaves and decodes the message. The RRC messages are fed to control unit (CU) 209 that also receives SIR estimates, PDP information as well as signal quality estimates.

Based on all this information, the CU 209 which can reside in the UE or at a NW node, determines whether IFM needed and if CM or SADRM for IFM should be used when performing IFM (e.g., performs the steps seen in steps 120 and 130 of FIG. 1). If it is determined, by either the NW or the UE, that compressed mode is to be used, a compressed mode request is fed to the transmitter of the UE (not shown) and, if such determination was made by the UE, is transmitted to the NW base station (not shown). CU 209 then, on a regular basis, schedules IFM. When compressed mode is used when performing IFM, the reception is interrupted at CM gaps and both carrier frequencies $f_0$, and $f_1$ are changed to the carrier frequency on which IFM is to be executed. When the CM gap is complete, the carrier frequency is changed back again.

In the case in which SADRM is used for IFM, CU 209, on a regular basis, changes the carrier frequency $f_1$ to the carrier frequency on which the UE is to perform IFM. The information from a single receiver branch is then fed to the measurement unit 207. The carrier frequency for the other receiver branch is however unchanged and the data reception is made as described above using SADRM. When the IFM measurement period is finalized CU 209 changes $f_1$ back to the original carrier frequency whereby the UE is placed into dual antenna data reception mode for detecting data.

Figure 3:
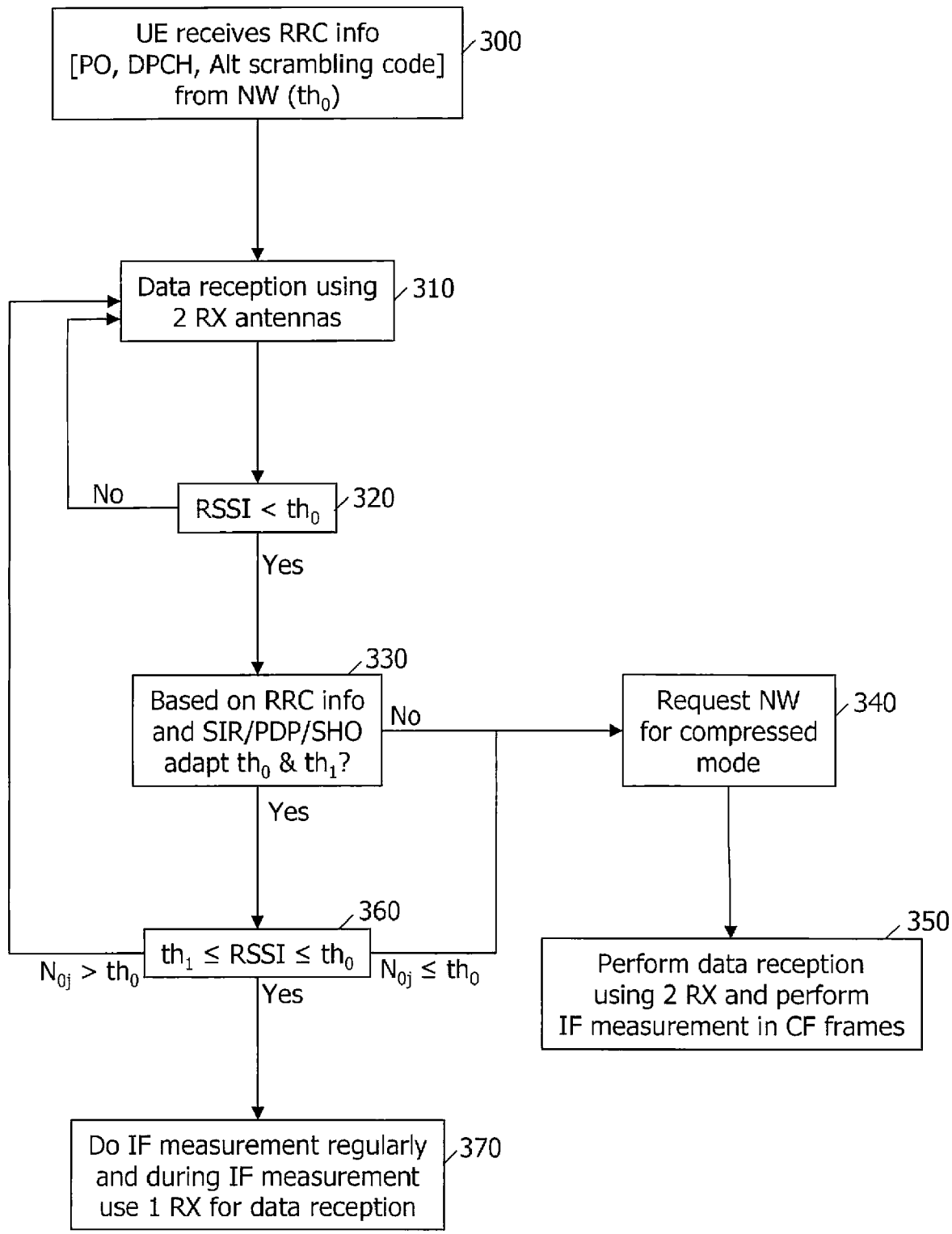
FIG. 3 is a flow chart of the steps of another embodiment of the present invention.

A second embodiment of method of the present invention can be seen in the flow chart of FIG. 3. In some situations, it must be determined, by either the UE or the NW, whether CM is available such that when IFM is needed, whether it can switch into CM. In these situations, as seen in step 300, the UE signals "compressed mode needed for IFM" to the NW and receives the CM related RRC information. In step 310, the UE detects data using both receiver branches. In step 320, the quality of the received signal is estimated and compared to a certain threshold $th_0$, obtained from the NW indicating when IFM is needed and can be used by the UE to trigger CM. If the quality is below $th_0$, then, in step 330 based on the RRC information and possible instantaneous SIR and PDP information, it is determined, by the UE or the NW, whether the CM threshold should be adapted to a new value $th_0 < th_1$. Adaption could be made if the CM capacity loss is estimated to be higher than the receiver diversity gain as discussed above. If no adaption of the threshold is determined, indicating CM is a better choice than SADRM, then in step 340, either the NW directs the UE to use CM or the UE requests CM from the NW. Thereafter, in step 350, the UE uses dual antenna data reception and interrupts the reception during CM gaps to perform IFM. In step 360, if the threshold is adapted, a new signal quality comparison to the new threshold is made, whereupon, if the received signal quality is less than $th_0$ the method returns to step 340, otherwise, in step 370, the UE goes into SADRM and uses one antenna and receiver for IFM and one antenna for data reception.

In the situation where either the NW or UE determines to use CM for IFM and IFM is required on two different carrier frequencies, the UE has the ability to adapt, in CM gaps, the carrier frequencies, ($f_0$, $f_1$) as seen in FIG. 2, to different frequencies and perform IFM on two different carrier frequencies simultaneously. Hence, instead of adapting the carrier to a first frequency every odd CM gap, for example, and a second frequency every, even CM gap, the UE can measure on both frequencies in all CM gaps, thereby improving the measurement accuracy or cell search performance by a factor of two.

The description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for use in a user equipment (UE) having receiver diversity, comprising the steps of:
   first determining whether to perform inter-frequency (IF) or inter-Radio Access Technology (RAT) measurements (collectively, IFM);
   if it is determined to perform IFM, secondly determining whether to use compressed mode (CM) or single antenna data reception mode (SADRM); and
   using SADRM for IFM in the second determining step if an alternative scrambling code (ASC) is being used.

2. A method for use in a user equipment (UE) having receiver diversity, comprising the steps of:
   first determining whether to perform inter-frequency (IF) or inter-Radio Access Technology (RAT) measurements (collectively, IFM);
   if it is determined to perform IFM, secondly determining whether to use compressed mode (CM) or single antenna data reception mode (SADRM); and
   using CM in the second determining step if a packet service over HSDPA is ongoing.

3. A method for use in a user equipment (UE) having receiver diversity, comprising the steps of:
   first determining whether to perform inter-frequency (IF) or inter-Radio Access Technology (RAT) measurements (collectively, IFM);
   if it is determined to perform IFM, secondly determining whether to use compressed mode (CM) or single antenna data reception mode (SADRM), wherein the outcome of the second determining step is included in radio resource control (RRC) information received by the UE.

4. A method relating to inter-frequency (IF) or inter-Radio Access Technology (RAT) measurements (collectively, IFM) between a network (NW) and a user equipment (UE) having receiver diversity, comprising the steps of:
   estimating receiver diversity gain and compressed mode (CM) capacity loss;
   determining whether receiver diversity gain is larger than the CM capacity loss; and
   requesting CM for IFM if receiver diversity gain is larger than CM capacity loss, otherwise selecting single antenna data reception mode (SADRM) and at regular time intervals, using a first UE receiver branch for data detection and a second UE receiver branch for IFM.

5. The method of claim 4, wherein the receiver diversity gain over single antenna gain is estimated based on system parameters.

6. The method of claim 5, wherein such parameters include at least one of the following: use of an alternative scrambling code (ASC) in CM frames; the slot format or spreading factor; the Dedicated Physical Channel (DPCH) Pilot power offset (relative Dedicated Physical Data Channel (DPDCH)); and information about current services, such as voice/video, and packet over high speed downlink packet access (HSDPA).

7. The method of claim 5, wherein the system parameter information is received by the UE in Radio Resource Control (RRC) messages from the NW.

8. The method of claim 4, wherein the receiver diversity gain is estimated based on a Signal to Interference Ratio (SIR) and a power/delay profile (PDP).

9. The method of claim 4, further comprising determining whether to perform IFM by detecting whether the quality of the received signal is below a certain threshold.

10. The method of claim 4, further comprising determining by the UE if IFM is requested by the NW.

11. A method for use in a User Equipment (UE) of a mobile communications network, comprising the steps of
  determining if the quality of a received signal is below a predetermined threshold;
  reviewing a previously received Radio Resource Control (RRC) message;
  determining, based on the review of the RRC message, if an alternative scrambling code (ASC) is being used; and
  determining, based on whether an ASC is being used, whether to use a compressed mode (CM) or a single antenna data reception mode (SADRM) when performing inter-frequency (IF) or inter-Radio Access Technology (RAT) measurements (collectively, IFM).

12. The method of claim 11, further comprising performing calculations based on a power/delay profile (PDP) if ASC is being performed; and using CM if there are a high number of multi-paths.

13. The method of claim 11, further comprising the step of using SADRM if there are only a small number of multi-paths.

14. The method of claim 11, further comprising using CM if an ASC is not being used.

15. The method of claim 11, wherein it is determined to use CM, further comprising the steps of:
  using the UE dual receiver for data reception; and
  interrupting the reception in CM gaps to perform IFM.

16. The method of claim 11, wherein it is determined not to use CM, further comprising the steps of:
  switching, on a regular basis, into SADRM;
  and performing IFM at one receiver branch of the UE and data detection at the other receiver branch of the UE.

17. A method used in connection with inter-frequency (IF) or inter-Radio Access Technology (RAT) measurements (collectively, IFM), comprising the steps of:
  receiving, by a user equipment (UE) having receiver diversity, Radio Resource Control (RRC) information from a mobile communications network;
  detecting whether IFM is required, wherein the detection of whether IFM is to be used further comprises:
  receiving an IFM threshold from the mobile communications network;
  adapting the IFM threshold received from the mobile communications network to a lower second threshold based on Radio Resource Control (RRC) information; and
  using single antenna data reception mode (SADRM) for IFM if the quality of a received signal is above the second threshold and using compressed mode if the quality of the received signal is below the second threshold; and
  selecting by the UE, if IFM is needed, either to use dual antenna data reception for detecting data in compressed mode (CM) and performing IFM during gaps, or use single antenna data reception mode (SADRM), using the second antenna for IFM.

18. A method used in connection with inter-frequency (IF) or inter-Radio Access Technology (RAT) measurements (collectively, IFM), comprising the steps of:
  receiving, by a user equipment (UE) having receiver diversity, Radio Resource Control (RRC) information from a mobile communications network;
  detecting whether IFM is required; and
  selecting by the UE, if IFM is needed, either to use dual antenna data reception for detecting data in compressed mode (CM) and performing IFM during gaps, or use single antenna data reception mode (SADRM), using the second antenna for IFM, wherein, when CM is used for IFM, further comprising the steps of:
  adapting, by the UE during the CM gaps, the first receiver branch to a first intermediate frequency (IF) carrier frequency and the second receiver branch to a second IF carrier frequency; and
  performing IFM on the two IF carriers simultaneously.

19. A method used in connection with inter-frequency (IF) or inter-Radio Access Technology (RAT) measurements (collectively, IFM), comprising the steps of:
  providing, to a user equipment (UE), a compressed mode (CM) initial threshold value;
  receiving, by the UE having receiver diversity, Radio Resource Control (RRC) information from a mobile communications network;
  detecting whether IFM is required;
  selecting by the UE, if IFM is needed, either to use dual antenna data reception for detecting data in CM and performing IFM during gaps, or use single antenna data reception mode (SADRM), using the second antenna for IFM;
  the UE signaling to the network (NW) to determine if CM is available for IFM; and the NW transmitting to the UE Radio Resource Control (RRC) information; and
  determining, by the UE, whether the CM threshold should be adapted to a value greater than an initial threshold value based on RRC information when the quality of the received signal is below the initial threshold value.

20. The method of claim 19, where the determination of whether the quality of the received signal is below the initial threshold value is also based on instantaneous signal to interference ratio (SIR) and power delay profile (PDP) information.

21. The method of claim 20, wherein the CM threshold is adapted to a new threshold value greater than an initial threshold value, if the CM capacity loss is estimated to be higher than the receiver diversity gain and a new received signal quality comparison to the new threshold value is made.

22. A method for handling compressed mode (CM) when making inter-frequency (IF) or inter-Radio Access Technology (RAT) measurements (collectively, IFM) between a User Equipment (UE) and a mobile communications network (NW), comprising the steps of
  determining whether compressed mode (CM) is available;
  signaling, by the UE to the NW, a request as to whether CM is available for IFM;
  receiving, by the UE from the NW, CM related radio resource control (RRC) information;
  detecting, by the UE, data using a plurality of receiver branches;
  estimating and comparing received signal quality information to an initial threshold value obtained from the NW indicating when IFM is needed and can be used by the UE to trigger CM; and
  if the quality of the received signal is below the initial threshold value, determining by the UE, based on the RRC information and possible instantaneous signal to interference ratio (SIR) and power delay profile (PDP) information, whether the CM threshold should be adapted to a new threshold value greater than the initial threshold value.

23. The method of claim 22, wherein the step of determining whether the initial threshold value should be adapted to a greater new value is made if the CM capacity loss is estimated to be higher than the receiver diversity gain.

24. The method of claim 22, wherein if no adaptation of the threshold is determined, indicating CM is a better choice than single antenna data reception mode (SADRM), then requesting, by the UE, CM from the NW and thereafter using dual antenna data reception by the UE and interrupting the reception during CM gaps to perform IFM.

25. The method of claim 22, wherein if a greater threshold value is adopted, a new received signal comparison to the new threshold is made, whereupon, if the quality of the received signal is greater than the initial threshold value, the UE requests CM from the NW, otherwise the UE goes into single antenna data reception mode (SADRM) and uses one antenna and receiver for IFM and one antenna for data reception.

* * * * *